April 5, 1949.  C. PACE  2,466,267
ELECTRIC MOTOR

Filed Oct. 22, 1945  2 Sheets-Sheet 1

INVENTOR
CANIO PACE

BY H. G. Manning
ATTORNEY

April 5, 1949.　　　　C. PACE　　　　2,466,267
ELECTRIC MOTOR
Filed Oct. 22, 1945　　　　　　　　　　2 Sheets-Sheet 2
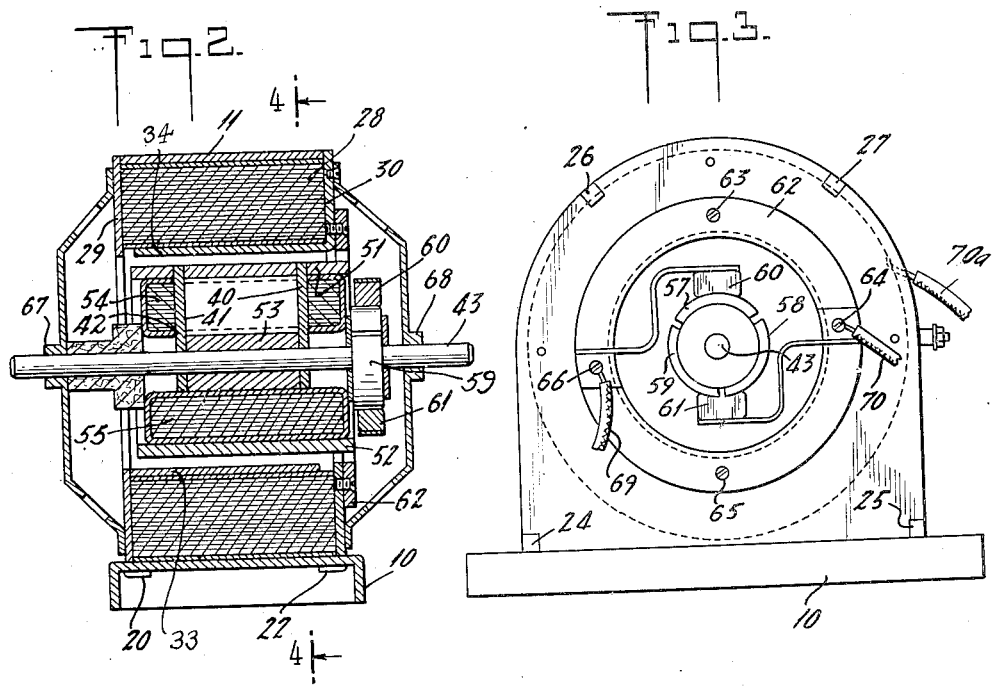
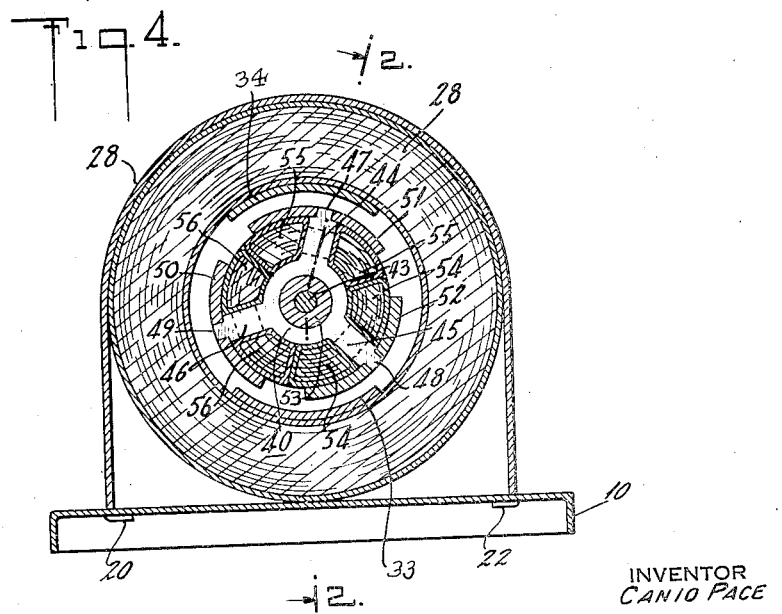
INVENTOR
CANIO PACE
BY H. G. Manning
ATTORNEY Patented Apr. 5, 1949

2,466,267

UNITED STATES PATENT OFFICE 2,466,267

ELECTRIC MOTOR

Canio Pace, Waterbury, Conn.

Application October 22, 1945, Serial No. 623,655

3 Claims. (Cl. 172—36)

This invention relates to electric motors and more particularly to a light duty motor of the series type, operable on either A. C. and D. C., and having a rotor surrounded by a single outer fixed field coil which also serves as a resistor to cut down the current and eliminate the need of a transformer.

One object of the present invention is to provide an electric motor of the above nature in which the field and rotor coils may be preformed and will always be located at right angles to each other.

A further object is to provide an electric motor of the above nature which will be light in weight, inexpensive to manufacture, which will not overheat, which will be simple in construction, easy to assemble, having no laminations, in which the rotor will be well-balanced, and will require the least amount of wiring to obtain the greatest concentration of propelling energy.

With these and other objects in view, there has been illustrated on the accompanying drawings one form in which the invention may conveniently be embodied in practice.

In the drawings,

Fig. 2 is a sectional view, taken along the broken line 2—2 of Fig. 4, looking in the direction of the arrows.

Fig. 3 is an end view of the motor.

Fig. 4 is a transverse sectional view taken along the line 4—4 of Fig. 2.

Figure 1:
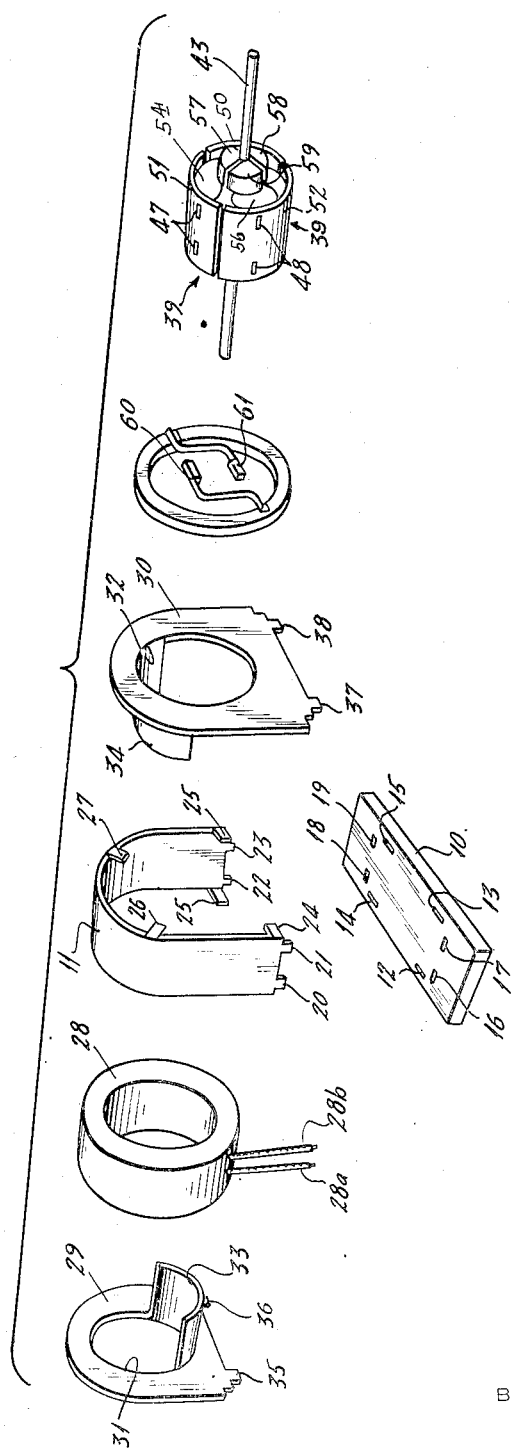
Fig. 1 represents an exploded view of the various components of the motor shown in separated relation.

Referring now to the drawings in which like reference numerals denote corresponding parts throughout the several views, the numeral 10 indicates the base of the motor which is preferably rectangular in shape. The numeral 11 indicates a U-shaped casing mounted upon the base 10. The base 10 is provided with four longitudinal slots 12, 13, 14, 15, arranged at the corners of a rectangle, and four transverse slots 16, 17, 18, 19, similarly arranged.

The U-shaped casing is provided with four depending lugs 20, 21, 22, 23 on the bottom edges thereof for fitting into the transverse slots 16, 17, 18, 19. The legs of the casing 11 are also provided at the bottom with two pairs of inturned horizontal lugs 24, 25, and a pair of upper inturned inclined lugs 26, 27.

Fitted within the casing 11 is a single outer field coil 28 which is embraced by a pair of outer end plates 29, 30 having central circular apertures 31, 32. The end plates 29, 30 are provided with opposed inwardly-extending integral arcuate poles 33, 34 which are substantially semicircular in shape, and are adapted to embrace the upper and lower parts of the single outer field coil 28. The end plates 29, 30 are provided with depending lugs 35, 36, and 37, 38, respectively, which are adapted to be located in the longitudinal slots 12, 14, and 13, 15, respectively, of the base 10 for attaching said end plates to said base.

Located within the fixed field coil 28 is a horizontal rotor 39 comprising a pair of spiders 40, 41 having central apertures 42 which are adapted to fit over a horizontal rotor shaft 43 as shown in Figs. 2, 3, and 4. Each of the spiders 40, 41 is provided with a set of three radial legs 44, 45, 46, having lugs 47, 48, 49 on the extremities thereof for engaging in longitudinal end slots formed in three circularly arranged longitudinal arcuate bars 50, 51, 52 to form a rigid rotor assembly. Located within the bars 50, 51, 52, and fitted about a central spacer sleeve 53 are three longitudinal rotor coils 54, 55, 56 which are connected at their ends to three arcuate commutator segments 57, 58, 59, which are adapted to be engaged by a pair of brushes 60, 61 having curved inner faces. The brushes 60, 61 are connected to a pair of conductor wires 69, 70 leading to the inside of the field coil 28 and to one side of a suitable source of A. C. or D. C., respectively. The other side of said source is connected by a conductor 70a to the outside of the coil 28. The brushes are mechanically connected together by means of an insulating outer ring 62 which is attached as by screws 63, 64, 65, 66 to the outer end plate 30. Provision is also made of a pair of bearings 67, 68 for the ends of the rotor shaft 43, as most clearly shown in Fig. 2.

One advantage of the present construction is that the interior parts of the motor will be securely protected against injury by means of the two end plates and the U-shaped outer casing.

A further advantage is that the resistance of the field coil serves to reduce the starting current.

A still further advantage is that the present invention permits the use of a single coil in the outer field instead of the usual pair of north-south pole field coils.

While there has been disclosed in this specification one form in which the invention may conveniently be embodied in practice, it is to be understood that this form is shown for the purpose of illustration only, and that the invention may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an electric motor, a base, a U-shaped casing supported upon said base, an outer fixed field coil fitted rigidly within the upper part of said casing, curved poles embracing the upper and lower inner portions of said field coil, respectively, and an interior rotor located between said poles and connected to a source of electric current, said rotor comprising a pair of spaced spiders, three longitudinal bars mounted peripherally on said spiders, and three transversely wound hollow coils fitted within said bars and embracing said spiders, whereby the interior of each coil constitutes an air space between said spiders.

2. In an electric motor, a base, a U-shaped casing supported upon said base, an outer fixed field coil fitted rigidly within the upper part of said casing, curved poles embracing the upper and lower inner portions of said field coil, respectively, and an interior rotor located between said poles and connected to a source of electric current, said rotor comprising a central shaft, a pair of spiders including radial legs mounted on said shaft, a plurality of longitudinal curved bars connected to said legs, a sleeve located on said shaft and spacing said spiders to provide an air space therebetween, a plurality of transversely wound coils located within said bars, a plurality of commutator segments secured to said coils, and a pair of brushes engaging said segments for supplying current thereto.

3. In an electric motor, a base, a U-shaped casing supported upon said base, an outer fixed field coil fitted rigidly within the upper part of said casing, curved poles embracing the upper and lower inner portions of said field coil, respectively, and an interior rotor located between said poles and connected to a source of electric current, said rotor comprising a central shaft, a pair of spaced spiders including radial legs mounted on said shaft, a plurality of longitudinal curved bars connected to said legs, a plurality of transversely wound coils located within said bars, each coil embracing a pair of said legs, whereby the interior of each coil constitutes an air space between respective pairs of legs, and a plurality of commutator segments secured to said coils, said motor including a pair of brushes engaging said segments for supplying current thereto, and an insulating outer ring for holding said brushes in operating position.

CANIO PACE.

REFERENCES CITED

The following references are of record in the file of this patent:

UNITED STATES PATENTS

| Number | Name | Date |
|---|---|---|
| 270,781 | Freeman | Jan. 16, 1883 |
| 650,246 | Heidel | May 22, 1900 |
| 1,338,568 | Foote | Apr. 27, 1920 |
| 1,778,678 | Knecht | Oct. 14, 1930 |
| 2,177,472 | Barrett | Oct. 24, 1939 |
| 2,243,063 | Arey | May 27, 1941 |

FOREIGN PATENTS

| Number | Country | Date |
|---|---|---|
| 458,381 | Great Britain | Dec. 18, 1936 |